April 12, 1932.  J. B. GIERN  1,853,971
ADJUSTABLE CUTTER
Filed Jan. 7, 1929
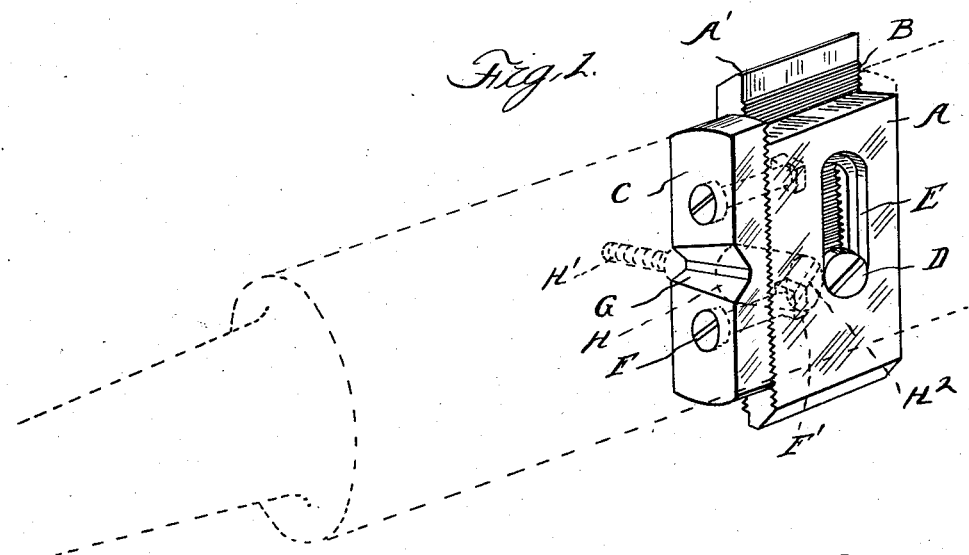
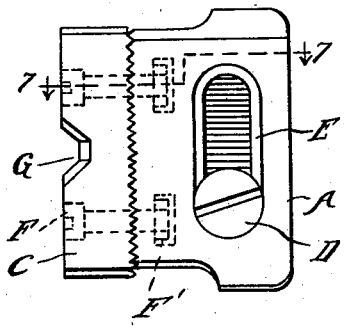 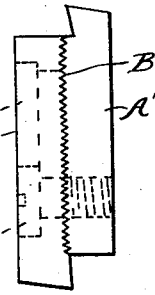 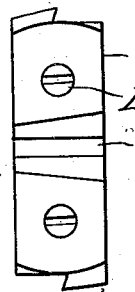 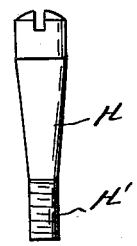
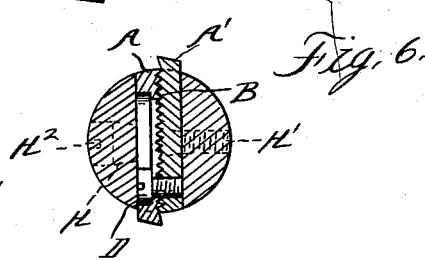
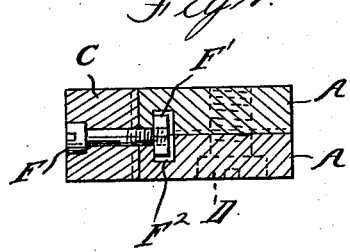
INVENTOR
James B. Giern
BY
ATTORNEYS Patented Apr. 12, 1932

1,853,971

UNITED STATES PATENT OFFICE

JAMES B. GIERN, OF DETROIT, MICHIGAN, ASSIGNOR TO DETROIT BORING BAR COMPANY, OF DETROIT, MICHIGAN, A CORPORATION OF MICHIGAN

ADJUSTABLE CUTTER

Application filed January 7, 1929. Serial No. 330,912.

The invention relates to adjustable cutters more particularly designed for use in connection with boring bars and of the type in which similar cutting edges are formed on diametrically opposite ends of the tool. It is essential with this type of cutter that the cutting edges should be held in rigid relation to the supporting bar and at exactly the same distance from the axis thereof. It is also necessary to provide for the sharpening of the cutting edges while maintaining the same diameter.

Heretofore various constructions of adjustable cutter blades have been devised which, however, have not been satisfactory in operation. The chief difficulty has been to secure the required rigidity while the blade is performing its work so as to obtain the desired accuracies it is obvious that any slight shifting of one cutting edge in relation to the other or in relation to the axis of the bar will destroy the accuracy of the cut. It is the object of the present invention to obtain a construction which while providing for adjustment maintains a high degree of rigidity. It is a further object to provide for fairly minute adjustments with a high degree of accuracy. With these objects in view the invention consists in the construction as hereinafter set forth.

In the drawings:

Figure 1 is a perspective view showing the cutter in full lines in relation to a boring bar indicated in dotted lines;

Figure 2 is a side elevation of the cutter;

Figure 3 is an end elevation thereof;

Figure 4 is an elevation from the opposite end;

Figure 5 is an elevation of the tapered securing pin;

Figure 6 is a transverse section through a boring bar showing the cutting tool clamped in rigid relation thereto.

Figure 7 is a section on the line 7—7 of Figure 2.

In the manufacture of boring bars it is usual to provide a transverse slot in which the cutter bar is placed and where a solid bar is used this may be securely clamped by a transversely extending tapered pin engaging a correspondingly tapered notch in the side edge of the bar. On the other hand where the cutter is adjustable, it is necessary to provide two blades which must be clamped in relation to each other as well as being clamped to the bar. With my improved construction I employ a pair of relatively adjustable cutter blades and a third member with respect to which both blades are adjustable. Said third member directly engages the clamping wedge or pin. I have also provided a construction in which these three members when adjusted are locked from any possibility of accidental displacement. This consists in forming on the abutting faces of the blades transversely extending serrations which will interlock with each other. Similar serrations are formed on the edges of the blades which abut against the third member, thereby obtaining a rigid interlocking engagement between this member and both of the blades.

In detail, A and A' are the cutter blades which are formed of rectangular bars of exact predetermined dimensions. The faces of these bars which are adjacent to each other are formed with a series of transverse serrations or teeth B which are preferably finely spaced as for instance about one thirty-second of an inch. The serrations are very accurately formed, preferably of a V-shape and of approximately a 60 degree angle. C is the clamping or holding member which is a rectangular bar and is of a width equal to the combined width of the bars A and A', when they are placed together. The member C is also provided with a serrated face but preferably one in which the serrations are only one-half the width of those between the members A and A'. Thus, if the latter are spaced one thirty-second of an inch, the spacing of the serrations in the member C would be one sixty-fourth of an inch. Similar serrations are formed in the edges of the members A and A' which abut against the member C.

To hold the members A, B and C in different positions of adjustment I have provided first a clamping screw D which engages a threaded aperture in the member A' and has its head engaging a shouldered slot E in the member A. This permits the screw D to clamp the blades A and A' to each other in whatever adjustment may have been made in their relative positions and when thus clamped to hold the interlocking serrations from disengagement, I also provide one or more clamping screws F for securing the member C to the blades. As shown, these screws F are arranged in the central or meeting plane of the members A and A' and engage nuts F' which are arranged in registering grooves F² in the members A and A'. The arrangement is such that when the members A and A' are relatively adjusted the nuts F' can slide in the grooves F², but when the screws F are tightened they will clamp the member C to said members A A'. The member C is provided on its outer face with a notch G which is preferably tapered from one side to the other and is adapted to engage a tapering pin H. The latter is inserted in an aperture in the boring bar which extends transversely of the slot for receiving the cutter. The pin is also provided with a threaded end portion H' for engaging the correspondingly threaded portion of the aperture and by means of which the pin may be drawn inward to effect the clamping. The outer end of the pin is provided with a cross slot H² for the engagement of a screw driver by which it is operated.

With the construction as described, before inserting the cutter into the boring bar the blades A and A' may be adjusted in relation to each other so that the cutting edges of said blades are an exact distance apart. The blades are then clamped in this position of adjustment by the tightening of the screw D. I next adjust the clamping blades in relation to the member C so that the spacing between the axial plane of the notch G and the cutting edges of the respective blades is equal. Such adjustment is facilitated by the exactness of the serrations so that it is unnecessary for the operator to make use of calipers or any other measuring instrument. When the member C is properly positioned and clamped by the screws F, the whole assembly may be slipped into the slot in the boring bar and then clamped by the insertion of the pin H and the screwing of the same into tight engagement. As all of the members are of exact rectangular form they can be made to accurately fit the slot in the boring bar and adjustment between the members will not in any way effect the cross sectional size of the assembly.

In use the tool may be easily and quickly adjusted for any desired diameter of bore and after adjustment may be ground to sharpen the cutting edges in the usual manner.

What I claim as my invention is:

1. A cutting tool comprising a pair of blades of oblong rectangular cross section having serrated adjacent faces permitting relative adjustment thereof with interlocking engagement in each position of adjustment, clamping means for holding said blades with the serrations in interlocking engagement, a third member arranged at one edge of the pair and having transversely extending serrations engaging corresponding serrations in both members of the pair, means for clamping said third member with the serrations in interlocking engagement with the pair of members, and positioning and clamping means engaging said third member for securing the same and the whole assembly in rigid position in relation to the holder.

2. The combination with a boring bar having transversely extending tool holding slot, of a cutting tool comprising a pair of blades having serrated engaging faces, a third member of a width equal to the combined width of said blades and having a serrated edge for engaging correspondingly serrated edges of said blades, means for clamping said blades to each other and said third member thereto in different positions of adjustment, and a pin engaging said boring bar to extend in the direction transverse to said tool holding slot, said pin engaging a notch in said third member and serving to clamp the same and the whole assembly in rigid relation to the bar.

3. A cutting tool comprising a holder, a pair of oppositely extending blades having adjacent faces, means for clamping said adjacent faces together in different positions of relative adjustment, a third member adjacent to one edge of said pair of blades, means for adjustably clamping said third member to the pair, and means for holding said third member in a predetermined position in said holder to center the blades with respect to the axis of the holder.

4. The combination with a tool holder recessed to receive a cutter, of a pair of oppositely extending cutter blades having adjacent faces, means for clamping said blades to each other in different positions of relative adjustment, a third member relatively adjustable and adjacent to one edge of the pair of blades, means independent of said holder for clamping said third member to said pair of blades in different positions of relative adjustment and means for holding said third member in predetermined position in said holder adapted to hold the entire assembly in fixed relation to said holder and position said blades with respect to the axis of said holder.

5. The combination with a tool holder recessed to receive a cutter, of a cutter assembly comprising a pair of oppositely extending relatively adjustable blades having transversely serrated adjacent faces, means for clamping said blades with said serrations in interlocking engagement, a third member adjacent to the pair of blades and having transverse serrations engaging corresponding serrations in said blades, means for locking said third member in said tool holder adapted to hold the entire assembly in rigid relation thereto.

6. A cutting tool comprising a pair of oppositely extending blades having transverse serrations on their adjacent faces permitting of relative adjustment, the cutting edges of said blades being in the plane of said adjacent faces, clamping means for holding said serrations in interlocking engagement, and a third member at one edge of the pair transversely serrated for engaging serrations in both members thereof, the serrations in said third member being spaced one-half the width of the serrations in the adjacent faces of said blades.

In testimony whereof I affix my signature.

JAMES B. GIERN.